United States Patent
Kim et al.

(10) Patent No.: US 7,095,445 B2
(45) Date of Patent: Aug. 22, 2006

(54) METHOD OF DETECTING MOTION IN AN INTERLACED VIDEO SEQUENCE BASED ON LOGICAL OPERATION ON LINEARLY SCALED MOTION INFORMATION AND MOTION DETECTION APPARATUS

(75) Inventors: Yeong-Taeg Kim, Irvine, CA (US); Shin-Haeng Kim, Paldal-Ku Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 659 days.

(21) Appl. No.: 10/001,676

(22) Filed: Oct. 23, 2001

(65) Prior Publication Data

US 2002/0136305 A1    Sep. 26, 2002

Related U.S. Application Data

(60) Provisional application No. 60/273,100, filed on Mar. 2, 2001, provisional application No. 60/257,365, filed on Dec. 20, 2000, provisional application No. 60/257,338, filed on Dec. 20, 2000.

(51) Int. Cl.
   H04N 5/14   (2006.01)
   H04N 7/01   (2006.01)
   H04N 9/64   (2006.01)
   H04N 11/20  (2006.01)

(52) U.S. Cl. .................. 348/448; 348/452; 348/451; 348/701

(58) Field of Classification Search .............. 348/448, 348/451, 452, 699–701, 910, 620, 607, 154, 348/155, 169; H04N 7/01, 11/20, 5/14, 9/64

See application file for complete search history.

(56) References Cited

U.S. PATENT DOCUMENTS

| | | | | |
|---|---|---|---|---|
| 4,661,853 A | * | 4/1987 | Roeder et al. | 348/701 |
| 4,933,759 A | * | 6/1990 | Van der Meer et al. | 348/700 |
| 5,027,201 A | * | 6/1991 | Bernard | 348/702 |
| 5,051,826 A | * | 9/1991 | Ishii et al. | 348/448 |

(Continued)

OTHER PUBLICATIONS

Simple line doubling scheme, vertical filtering edge controlled interpolation method disclosed in the IEEE Transactions on Consumers Electronics, pp. 279-289, Aug. 1989 by D.I. Hentschei.

(Continued)

*Primary Examiner*—Brian P. Yenke
(74) *Attorney, Agent, or Firm*—Michael Zarrabian, Esq.; Kenneth. L. Sherman, Esq.; Myers Dawes Andras & Sherman, LLP (57) ABSTRACT

A motion decision value provides a dependable estimate whether motion occurs in a given region of a video image in an interlaced video sequence. The motion detection is particularly applicable in the conversion from interlaced video to progressive video. An input first is fed to an absolute value former which computes a frame difference signal from a difference between the first field and the second field in one frame. A point-wise motion detection in the frame difference signal is then followed by a region-wise motion detection that combines the point-wise motion detection signal with an adjacent point-wise motion detection signal delayed by one field. The motion decision value is then computed from the region-wise motion detection signal and output for further processing in the video signal processing system, such as for choosing whether the spatially interpolated video signal value or the temporally interpolated video signal value should be used for the output.

25 Claims, 8 Drawing Sheets

U.S. PATENT DOCUMENTS

| | | | |
|---|---|---|---|
| 5,081,532 A * | 1/1992 | Rabii | 348/452 |
| 5,434,627 A * | 7/1995 | Weston | 348/609 |
| 5,534,935 A * | 7/1996 | Kawai et al. | 348/448 |
| 5,600,377 A * | 2/1997 | David et al. | 348/452 |
| 5,638,139 A * | 6/1997 | Clatanoff et al. | 348/701 |
| 5,661,525 A * | 8/1997 | Kovacevic et al. | 348/452 |
| 5,796,437 A * | 8/1998 | Muraji et al. | 348/452 |
| 5,943,099 A * | 8/1999 | Kim | 348/448 |
| 5,959,681 A | 9/1999 | Cho | |
| 6,014,182 A * | 1/2000 | Swartz | 348/700 |
| 6,037,986 A * | 3/2000 | Zhang et al. | 375/240.12 |
| 6,061,100 A * | 5/2000 | Ward et al. | 348/607 |
| 6,072,531 A * | 6/2000 | Shibano | 348/448 |
| 6,108,041 A * | 8/2000 | Faroudja et al. | 348/446 |
| 6,122,017 A * | 9/2000 | Taubman | 348/620 |
| 6,239,842 B1 * | 5/2001 | Segman | 348/448 |
| 6,266,092 B1 * | 7/2001 | Wang et al. | 348/448 |
| 6,268,886 B1 * | 7/2001 | Choi | 348/448 |
| 6,275,259 B1 * | 8/2001 | Gowda et al. | 348/229.1 |
| 6,288,745 B1 * | 9/2001 | Okuno et al. | 348/448 |
| 6,295,091 B1 * | 9/2001 | Huang | 348/448 |
| 6,307,560 B1 * | 10/2001 | Kondo et al. | 345/619 |
| 6,317,165 B1 * | 11/2001 | Balram et al. | 348/699 |
| 6,330,032 B1 * | 12/2001 | Boehlke | 348/452 |
| 6,331,874 B1 * | 12/2001 | de Garrido et al. | 348/452 |
| 6,340,990 B1 * | 1/2002 | Wilson | 348/448 |
| 6,348,949 B1 * | 2/2002 | McVeigh | 348/452 |
| 6,414,719 B1 * | 7/2002 | Parikh | 348/448 |
| 6,418,233 B1 * | 7/2002 | Kondo et al. | 382/107 |
| 6,421,090 B1 * | 7/2002 | Jiang et al. | 348/452 |
| 6,449,312 B1 * | 9/2002 | Zhang et al. | 375/240.16 |
| 6,452,639 B1 * | 9/2002 | Wagner et al. | 348/448 |
| 6,452,972 B1 * | 9/2002 | Ohara | 375/240.12 |
| 6,459,455 B1 * | 10/2002 | Jiang et al. | 348/452 |
| 6,483,546 B1 * | 11/2002 | Kondo et al. | 348/458 |
| 6,512,550 B1 * | 1/2003 | de Garrido et al. | 348/452 |
| 6,621,936 B1 * | 9/2003 | Kondo et al. | 382/260 |
| 6,630,961 B1 * | 10/2003 | Shin et al. | 348/448 |
| 6,633,612 B1 * | 10/2003 | Selby | 375/240.16 |
| 6,636,267 B1 * | 10/2003 | Adachi | 348/448 |
| 6,647,062 B1 * | 11/2003 | Mackinnon | 375/240.16 |
| 6,754,371 B1 * | 6/2004 | Kondo et al. | 382/107 |
| 6,795,123 B1 * | 9/2004 | Gotanda et al. | 348/448 |
| 6,822,691 B1 * | 11/2004 | Kim et al. | 348/452 |
| 6,829,013 B1 * | 12/2004 | Thompson et al. | 348/448 |
| 6,847,405 B1 * | 1/2005 | Hsu et al. | 348/452 |
| 6,859,237 B1 * | 2/2005 | Swartz | 348/700 |
| 6,909,466 B1 * | 6/2005 | Scheffler et al. | 348/459 |
| 2002/0027610 A1 * | 3/2002 | Jiang et al. | 348/448 |
| 2004/0184541 A1 * | 9/2004 | Brockmeyer et al. | 375/240.16 |
| 2004/0196901 A1 * | 10/2004 | Demos | 375/240 |
| 2004/0202245 A1 * | 10/2004 | Murakami et al. | 375/240 |

OTHER PUBLICATIONS

Edge direction dependent deinterlacing method disclosed in the Proc. of the Int. Workshop on HDTV, 1994, by D. Bagni, R. Lancini, and S. Tubaro, S Landi pp. 137-145.

Nonlinear interpolation methods based on: a weighted median filter disclosed in the Proc. of IEEE ISCAS, pp. 433-436 Portland, USA, May 1989, by J. Juhola, A. Nieminen, J. Sal, and Y. Neuvo.

Nonlinear interpolation based on: FIR median hybrid interpolation disclosed in Pro. of SPIE's Visual Communications and Image Processing, Lausanne, Switzerland, Oct. 1990, pp. 135-142 by A. Lehtonen and M. Renfors.

Nonlinear interpolation methods based on: a complementary median filter disclosed in Proc. of the Int. Workshop on HDTV, 1994 by H. Blume, I. Schwoerer, and K. Zygis, pp. 127-135.

A motion adaptive method disclosed in IEEE Transactions on Consumer Electronics, pp. 110-114, May 1990 by C. Markhauser.

* cited by examiner

$\phi_n(i,h) = f_n(i,h) + \min(f_{n-1}(i-1,h), f_{n-1}(i+1,h))$ $\phi_n(i,h) = med(f_n(i,h), f_{n-1}(i-1,h), f_{n-1}(i+1,h))$ $\phi_n(i,h) = \max(f_n(i,h), f_{n-1}(i-1,h), f_{n-1}(i+1,h))$

METHOD OF DETECTING MOTION IN AN INTERLACED VIDEO SEQUENCE BASED ON LOGICAL OPERATION ON LINEARLY SCALED MOTION INFORMATION AND MOTION DETECTION APPARATUS

CROSS-REFERENCES TO RELATED APPLICATIONS

Applicants claim the benefit of U.S. Provisional Application No. 60/257,338 entitled "Methods of Detecting Motion in an Interlaced Video Sequence Based on Logical Operation on the Linearly Scaled Motion Information and the Apparatus Therefor," filed Dec. 20, 2000, U.S. Provisional Application No. 60/257,365 entitled "Methods of Detecting Motion in an Interlaced Video Sequence Utilizing Region-Wise Motion and Apparatus" filed Dec. 20, 2000, and U.S. Provisional Application No. 60/273,100 entitled "Method of Detecting Repetitive Motion In An Interlaced Video Sequence and Apparatus Therefore," filed Mar. 2, 2001, which applications are incorporated herein by reference.

BACKGROUND OF THE INVENTION

1. Field of the Invention

The present invention lies in the signal processing field. More specifically, the present invention pertains to a method of detecting motion in an interlaced video sequence. The invention is particularly applicable to the conversion of an interlaced video signal to a progressive frame video signal, whereby regional motion information is utilized to define whether or not the video sequence contains motion or represents still image information. The present invention also pertains to an apparatus for performing the claimed method.

2. Description of the Related Art

In the development of current digital TV (DTV) systems, it is essential to employ a video format conversion unit because of the variety of the video formats adopted in many different DTV standards worldwide. For instance, the ATSC DTV standard system of the North America adopted 1080x1920 interlaced video, 720x1280 progressive video, 720x480 interlaced and progressive video, and so on, as its standard video formats for digital TV broadcasting. Video format conversion refers to a signal processing operation in which an incoming video format is converted to a specified output video format so that the output video can be properly displayed on a displaying device such as a monitor, FLCD, or a Plasma display, which has a fixed resolution.

Video format conversion systems are of significant importance since the conversion can directly affect the visual quality of the video of a DTV receiver. Fundamentally, the video format conversion operation requires advanced algorithms for multi-rate system design, poly-phase filter design, and interlaced-to-progressive scanning rate conversion or simply deinterlacing. Deinterlacing represents an operation that doubles the vertical scanning rate of the interlaced video signal.

Interlaced video in general is a sequence of separately arriving fields, such as A1, A2, A3, etc., where A1, A2, and A3 are interlaced images with A1 being a top image, A2 being a bottom image, A3 being the next top image, and so on. The most popular systems currently in use, namely NTSC, PAL, and SECAM are two-field systems, where two consecutive fields (such as the top field A1 and the bottom field A2) make up a frame. Each scanned field contains, i.e., updates, every other line of a corresponding frame and the number of lines in the frame is twice the number of lines in each of the fields which contain video information. Typically, the first field is identified with odd-numbered lines and the second field is identified with even-numbered lines. The fields are scanned onto the display screen one after the other at a defined frequency.

By way of example, NTSC scans close to 30 frames (60 fields of interlaced video) per second, with 525 lines per frame, and a horizontal to vertical aspect ratio of 4:3. The frame difference, therefore, is the difference between two fields having the same types (top or bottom) such as A1 and A3, or A2 and A4. PAL and SECAM scan 25 frames per second, with 625 lines per image, and the same aspect ratio of 4:3. As noted, the interlacing in all of these systems is 2:1, i.e., two fields per one frame. The primary reason for the interlacing of the lines between the fields is to reduce flicker in the display. An image that is updated, say, only 30 times a second would allow the human eye to perceive the scanning, because the image information would already start to fade before the next image is scanned onto the screen. When two fields are used, and each contains half of the information, the scanning rate in effect is raised to 60 Hz, and the human eye no longer perceives any flicker.

Deinterlacing refers to the filling of unavailable lines in each of the fields A1, A2, A3, and so on. As a result of deinterlacing, a 60 Hz field sequence (of interlaced video fields) becomes a 60 Hz progressive sequence.

Interlaced video is subject to several intrinsic drawbacks, referred to as artifacts. These include serrated lines that are observed when there is motion between fields, line flickering, raster line visibility, and field flickering. These also apply to DTV (digital TV) receivers. Historically, deinterlacing algorithms have been developed to enhance the video quality of NTSC TV receivers by reducing these intrinsic annoying artifacts of the interlaced video signal. Besides, elaborate deinterlacing algorithms utilizing motion detection or motion compensation provide excellent methods of doubling the vertical scanning rate of the interlaced video signal especially for stationary (motionless) objects in the video signal.

The present invention therefore also relates to the motion detection based deinterlacing operation that can be used for analog and digital TV receivers.

The state of the art includes a variety of deinterlacing algorithms, each having been exploited and studied comprehensively by many researchers during the last decade. Deinterlacing algorithms can be categorized into two classes, namely, 2-D (spatial) deinterlacing algorithms and 3-D (spatio-temporal) deinterlacing algorithms depending on the use of motion information embedded in consecutive interlaced video sequence. Combined spatial and temporal 3-D deinterlacing algorithms based on a motion detection give more pleasing performance than 2-D deinterlacing algorithms. The key point of a 3-D deinterlacing algorithm is how to precisely detect motion in the interlaced video signals. The publications in the following list disclose some of the applicable deinterlacing methods. They may be categorized as follows:

[1] Simple line doubling scheme, vertical filtering, vertical edge controlled interpolation method disclosed in the IEEE Transactions on Consumers Electronics, pp. 279–89, August 1989 by D. I. Hentschei;

[2] Edge direction dependent deinterlacing method disclosed in the Proc. of the Int. Workshop on HDTV, 1994, by D. Bagni, R Lancini, and S. Tubaro;

[3] Nonlinear interpolation methods based on:
a weighted median filter disclosed in the Proc. of the IEEE ISCAS, pp. 433–36, Portland, USA, May 1989, by J. Juhola, A. Nieminen, J. Sal, and Y. Neuvo,
FIR median hybrid interpolation disclosed in Pro. Of SPIE's Visual Communications and Image Processing, Lausanne, Switzerland, October 1990, 00. 125–32 by A. Lehtonen and M. Renfors,
a complementary median filter disclosed in Proc. of the Int. Workshop on HDTV, 1994 by H. Blume, I. Schwoerer, and K. Zygis,

[4] A motion adaptive method disclosed in IEEE Transactions on Consumer Electronics, pp. 110–114, May 1990 by C. Markhauser.

More recently, a new motion detection based deinterlacing method has been described in the following two, commonly assigned patents:

[5] U.S. Pat. No. 5,943,099, Aug. 24, 1999, issued to Young-Taeg Kim, entitled Interlaced-to-Progressive Conversion Apparatus and Method Using Motion and Spatial Correlation. There, an interlaced-to-progressive conversion device includes a spatial interpolator that provides for spatial interpolation and a temporal interpolator that provides for temporal interpolation of an interlaced video input signal. The system reduces jitter and related artifacts by temporally or spatially interpolating the signals.

[6] U.S. Pat. No. 5,959,681, Sep. 28, 1999, to Yong-Hun Cho, entitled Motion Picture Detecting Method. There, two separate field memories are utilized for detecting rapid motion and slow motion in an interlaced video sequence. An interlaced video signal is thereby converted into a progressive-scanned signal. Differences between spatial interpolation and temporal interpolation are used to determine whether the image is in motion. If the differences exceed certain defined thresholds, motion is determined. The thresholds are dynamically adapted during the process.

The core of the methods described in the latter two patents is to estimate a motion decision factor based on the frame difference signal and the sample correlation in the vertical direction. These methods provide a way of reducing the visual artifacts that can be possibly arising from false motion detection by utilizing the sample correlation in vertical direction of the sampling point where the value is to be interpolated. A common drawback of those methods, however, is that they do not provide a true motion detection method when there are high frequency components in the vertical direction. In other words, when there are high frequency components in the vertical direction, the methods described in the references [5] and [6] will come to the conclusion that motion pictures are processed.

As a consequence, in many instances, those prior art processing methods do not provide for an increase in the vertical resolution even when no real motion is present between fields.

SUMMARY OF THE INVENTION

It is accordingly an object of the invention to provide a motion detection method in an interlaced video sequence, which overcomes the above-mentioned disadvantages of the heretofore-known devices and methods of this general type and which provides for a robust method of estimating a motion decision parameter which is associated with the point to point degree of motion in the interlaced video sequence. It is another object of the present invention to disclose a deinterlacing method and apparatus by utilizing the motion decision parameter of the invention.

With the foregoing and other objects in view there is provided, in accordance with the invention, a method of computing a motion decision value for further utilization in a video signal processing system. The method comprises the following steps:

inputting a video signal with an interlaced video sequence;

computing a frame difference signal from a difference between a previous field and a next field in the video sequence;

forming a point-wise motion detection signal from the frame difference signal;

computing a region-wise motion detection signal from the point-wise motion detection signal and an adjacent point-wise motion detection signal delayed by one field; and forming from the region-wise motion detection signal a motion decision value and outputting the motion decision value for further processing in the video signal processing system.

In accordance with an added feature of the invention, the difference signal is low-pass filtered prior to the step of forming the point-wise motion detection signal.

The low-pass filter may be defined by a low pass filter matrix $$W_{M \times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where $w_{11}, \ldots w_{MN}$ represent a set of predetermined coefficients.

In accordance with an additional feature of the invention, the step of forming the point-wise motion detection signal comprises computing $$f_n(i,h) = l_K(d_n(i,h))$$

where $f_n$ is the point-wise motion detection signal, i and h define a spatial location of the respective video signal value in a cartesian matrix, $l_K(\bullet)$ denotes a linearly scaling function represented as $$l_K(y) = \begin{Bmatrix} 1, & \text{if} & y \geq K \\ y/K, & \text{otherwise} \end{Bmatrix}$$

in which K is a positive constant value, or, alternatively, with the linearly scaling function $$l_K(y) = \begin{Bmatrix} 1, & \text{if} & y \geq K \\ (y/K)^a, & \text{otherwise} \end{Bmatrix}$$

where K is still constant and a is a real number.

Various options are available for computing the region-wise motion detection signal from the point-wise motion detection signal. The following equations can be selected $$\phi_n(i, h) = f_n(i, h) + \min(f_{n-1}(i-1, h), f_{n-1}(i+1, h))$$

$$\phi_n(i, h) = \text{med}(f_n(i, h), f_{n-1}(i-1, h), f_{n-1}(i+1, h)), \text{ or}$$

$$\phi_n(i, h) = \max(f_n(i, h), f_{n-1}(i-1, h), f_{n-1}(i+1, h))$$

where $f_{n-1}(\bullet)$ denotes a motion detection signal delayed by one field, med($\bullet$) denotes a median operation, max($\bullet$) denotes an operation to minimize an error from a false motion detection, and the indices i and h define a spatial location of the respective video signal value in a cartesian matrix.

In accordance with another feature of the invention, the region-wise motion detection signal is low-pass filtered prior to the outputting step. In a preferred embodiment, the region-wise motion detection signal is low-pass filtered to form the motion decision value $m_n(i,h)$ by:

$$m_n(i, h) = \sum_{p=-a}^{b} \sum_{q=-c}^{d} \phi_n(i+2 \times p, h+2 \times q) \cdot \alpha_{p,q}$$

where a,b,c,d$\geq$0, and $\alpha_{p,q}$ represents a set of normalized predetermined coefficients of a low pass filter.

The kernel of the low-pass filter may be defined as $$[\alpha'_{p,q}s] = \begin{bmatrix} 0 & 1/8 & 0 \\ 1/8 & 4/8 & 1/8 \\ 0 & 1/8 & 0 \end{bmatrix}.$$

With the above objects in view there is also provided, in accordance with the invention, a method of processing interlaced video signals, which comprises:

spatially interpolating a value of the video signal at a given location from a video signal of at least one adjacent location in a given video field;

temporally interpolating the value of the video signal at the given location from a video signal at the same location in temporally adjacent video fields; and forming a motion decision value for the same location in accordance with the above-outlined method; and mixing an output signal for the video signal at the given location from the spatially interpolated signal and the temporally interpolated signal and weighting the output signal in accordance with the motion decision value.

In accordance with again an added feature of the invention, the motion decision value is varied between 0 and 1 as a function of an estimate of the degree of motion at the given location and, upon estimating a high degree of motion, heavily weighting the output signal towards the spatially interpolated signal and, upon estimating a low degree of motion, heavily weighting the output signal towards the temporally interpolated signal.

In accordance with again an additional feature of the invention, the spatially interpolated signal is output as the output signal upon estimating a high degree of motion, and the temporally interpolated signal is output as the output signal upon estimating a low degree of motion.

With the above and other objects in view there is also provided, in accordance with the invention, an apparatus for computing a motion decision value in a video processing system. The apparatus comprises:

an input for receiving a video signal with an interlaced video sequence;

difference forming means connected to the input for computing a frame difference signal from a difference between a previous field and a next field of a current field to be deinterlaced;

means for forming a point-wise motion detection signal from the frame difference signal, and for computing a region-wise motion detection signal from the point-wise motion detection signal and an adjacent point-wise motion detection signal delayed by one field; and means for forming from the region-wise motion detection signal a motion decision value and for outputting the motion decision value for further processing in the video signal processing system.

The apparatus is configured and/or programmed to perform the method outlined above.

A corresponding apparatus of processing interlaced video signals, for example for interlaced to progressive conversion, comprises:

an input for receiving a video signal with an interlaced video sequence of fields;

a spatial interpolator connected to the input and configured to spatially interpolate a value of the video signal at a given location from a video signal of at least one adjacent location in a given video field;

a temporal interpolator connected to the input in parallel with the spatial interpolator for temporally interpolating the value of the video signal at the given location from a video signal at the same location in temporally adjacent video fields; and a computing apparatus as outlined above connected to the input and in parallel with the spatial interpolator and the temporal interpolator for forming a motion decision value for the same location; and a mixer connected to receive an output signal from each of the spatial interpolator, the temporal interpolator, and the computing apparatus, the mixer being configured to mix an output signal for the video signal at the given location from the spatially interpolated signal and the temporally interpolated signal in dependence on the motion decision value output by the computing apparatus.

Other features which are considered as characteristic for the invention are set forth in the appended claims.

Although the invention is illustrated and described herein as embodied in a method of detecting motion in an interlaced video sequence based on logical operation on the linearly scaled motion information and an apparatus therefor, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
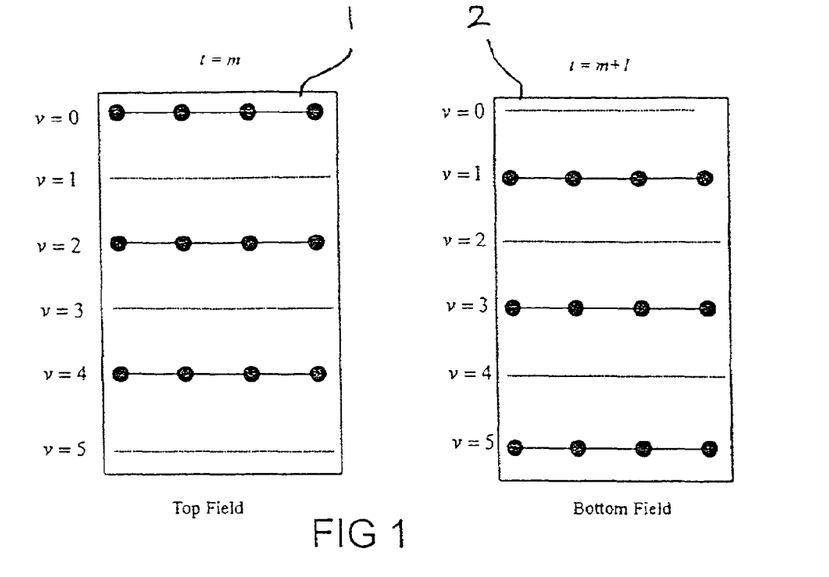
FIG. 1 is a diagrammatic view of two juxtaposed fields of a frame of an interlaced video sequence.

Referring now to the figures of the drawing in detail and first, particularly, to the introductory view of FIG. 1, an interlaced video sequence is a series of frames each including a plurality of fields. As noted above, all conventional systems utilize two fields per frame which are sequentially scanned. A top field 1 contains information regarding the first (v=0), third (v=2), fifth (v=4), etc. lines, and a bottom field 2 contains information regarding the second (v=1), fourth (v=3), sixth (v=5), etc. lines.

In order to systematically describe the deinterlacing problem and the methods of the present invention, let $x_n$ denote the incoming interlaced video field at a time instant t=n and $x_n(v,h)$ denote the associated value of the video signal at the geometrical location (v,h). The variable v represents the vertical location and h represents horizontal location, in the cartesian matrix system commonly applied. By definition, the signal values of $x_n$ of the interlaced video signal are available only for the even lines (v=0,2,4, . . . ) if $x_n$ is the top field 1. Similarly, the signal values of $x_n$ are available only for the odd lines of v (v=1,3,5, . . . ) if $x_n$ is the bottom field 2. Conversely, the signal values of $x_n$ are not available for odd lines if $x_n$ is a top field signal and the signal values of $x_n$ are not available for even lines if $x_n$ a bottom field. FIG. 1 shows the top field 1 scanned at t=m and the bottom field 2 scanned at t=m+1. Top and bottom fields are typically available in turn in the time axis, that is, the top and bottom fields are sequentially scanned to make up a frame.

Based upon the description of the interlaced video signal, deinterlacing problem can be stated as a process to reconstruct or interpolate the non-available signal values of each field. That is, the deinterlacing problem is to reconstruct the signal values of $x_n$ at the odd lines (v=1,3,5, . . . ) for the top field $x_n$ and to reconstruct the signal values of $x_n$ at the even lines (v=0,2,4, . . . ) for the bottom field $x_n$.

Figure 2:
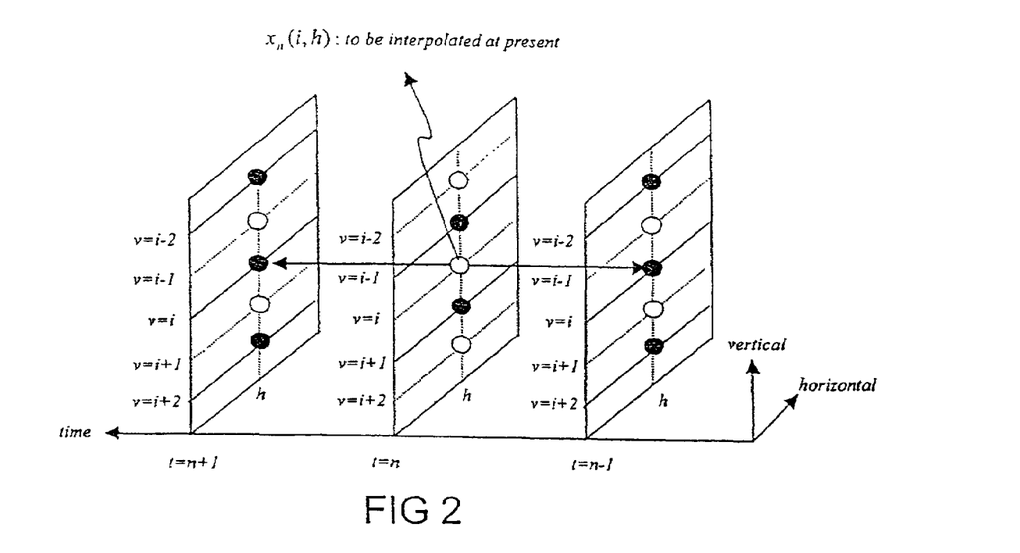
FIG. 2 is a diagrammatic illustration of three fields serving to describe the deinterlacing problem.

For the simple description of the present invention, and to avoid any notational confusion in the disclosure, the deinterlacing problem will be simplified as a process which reconstructs or interpolates the unavailable signal value of $x_n$ at the $i^{th}$ line where the signal values of the lines at i±1, i±3, i±5, . . . are available. More simply deinterlacing is to interpolate the value of $x_n(i,h)$, which is not originally available. It must be noted that, since $x_{n-1}$ and $x_{n+1}$ have a different sampling phase from $x_n$, the signal values of $x_{n-1}(i,h)$ and $x_{n+1}(i,h)$ are available, which is why motion detection can be incorporated with the deinterlacing problem. This relationship is depicted in FIG. 2, where dotted lines (and white circles) represent "no data available" and solid lines (and black circles) represent "available data."

Figure 3:
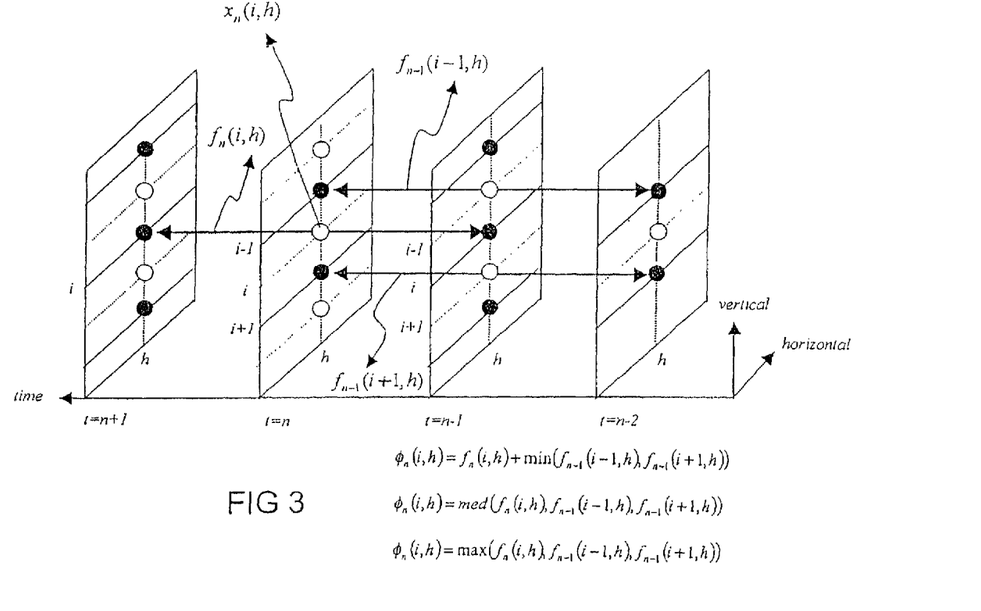
FIG. 3 is a more detailed view illustrating the deinterlacing process.
Figure 4:
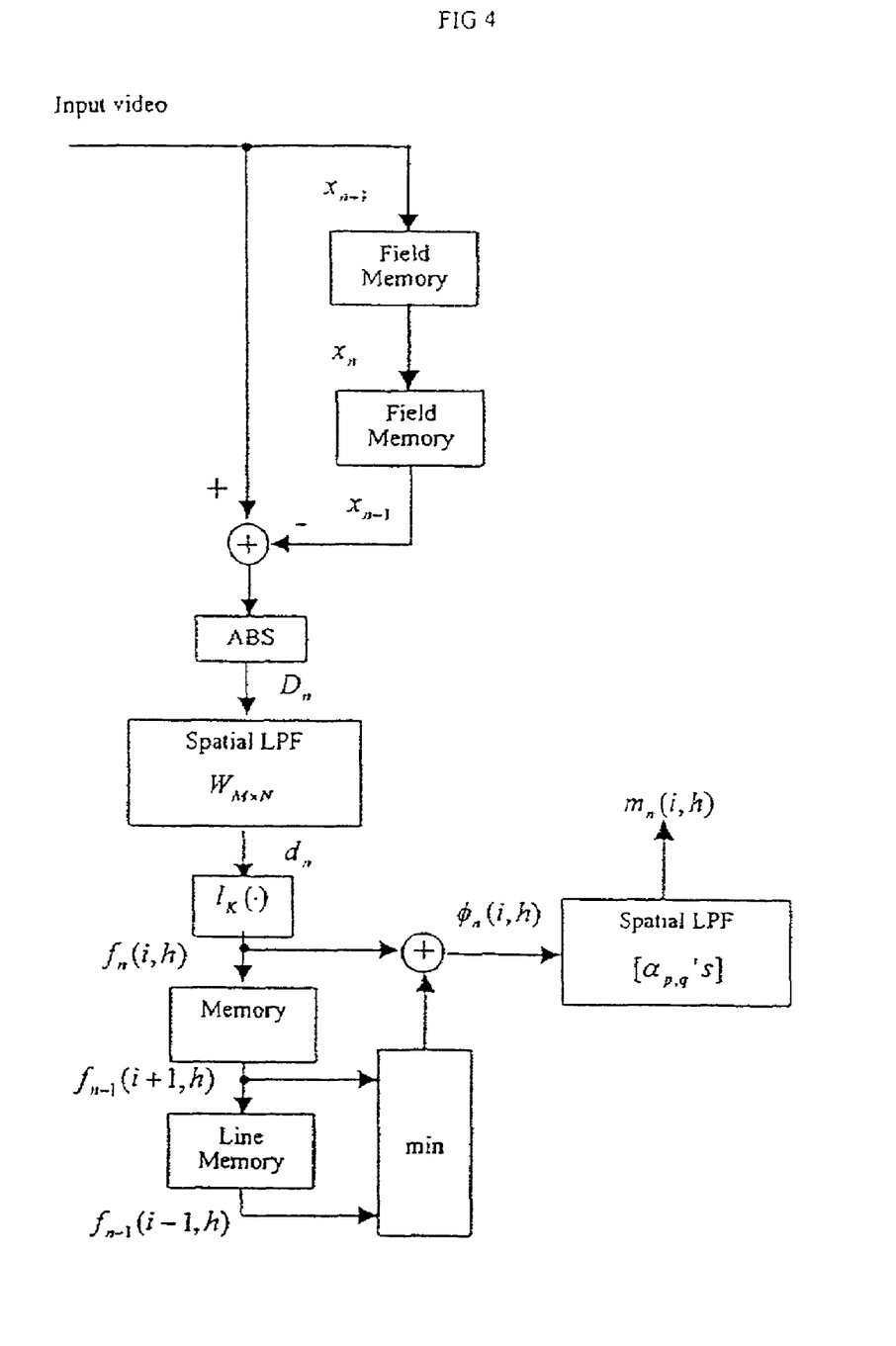
FIG. 4-6 are block diagrams illustrating the computation of a motion decision parameter according to three algorithms.
Figure 5:
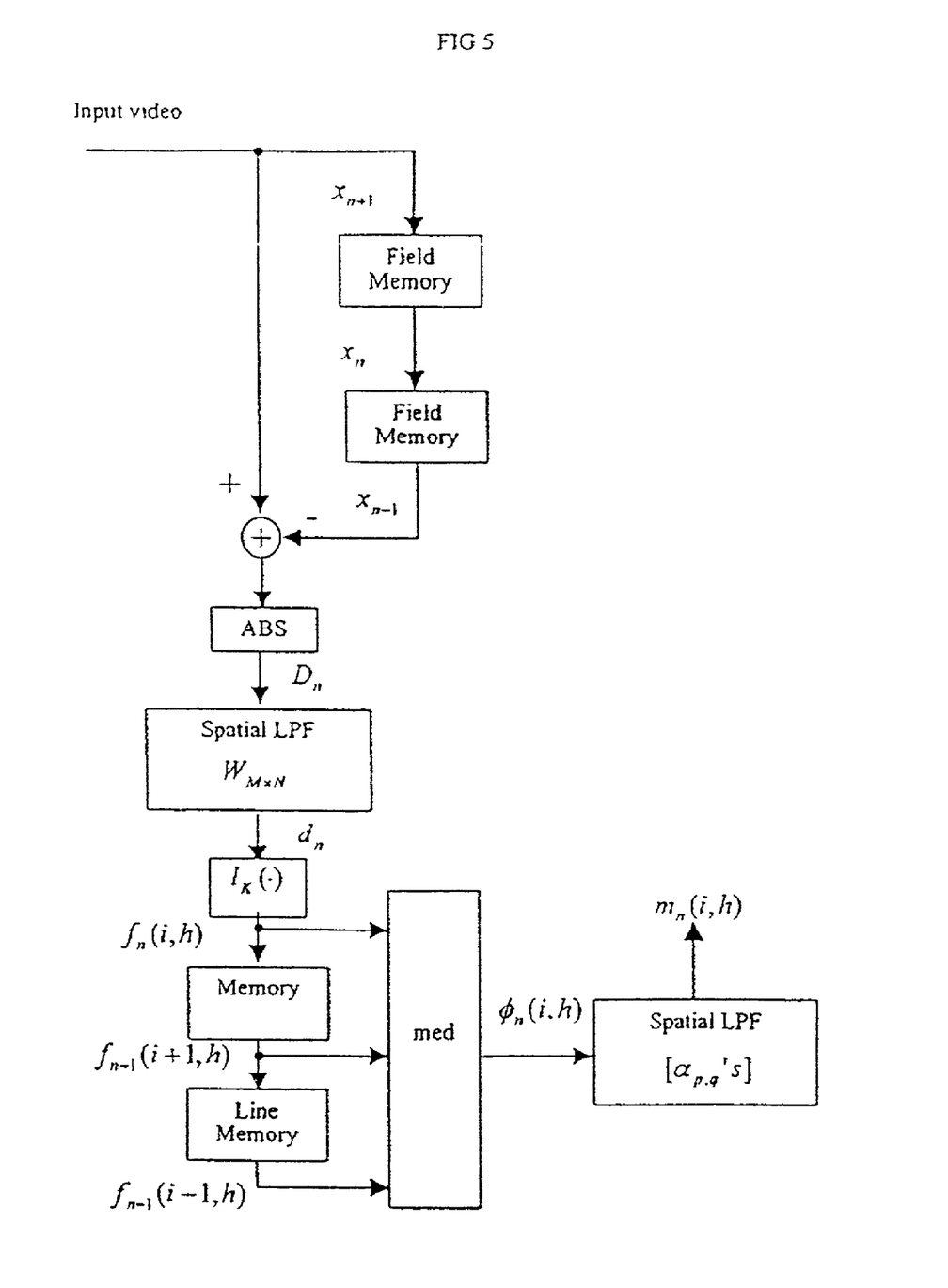

The deinterlacing method and an exemplary apparatus of the present invention with preferred embodiments will be better understood from the following description, which will make specific reference to FIGS. 3–5 of the drawing.

Referring now to FIG. 4, there is illustrated the novel method of estimating a motion decision parameter $m_n(i,h)$. Fundamentally, $m_n(i,h)$ is estimated from the incoming interlaced video sequence and associated with the point-to-point degree of motion in the interlaced video sequence. The importance or the usefulness of estimating $m_n(i,h)$ can be easily understood from FIGS. 2 and 3. Suppose that precise motion detection information is available when we interpolate $x_n(i,h)$ and suppose there is no motion at the spatial location (i,h), then the best interpolation for $x_n(i,h)$ is to use the value of $x_{n-1}(i,h)$. This follows logically from the fact that no motion is introduced between t=n−1 and t=n+1 at the spatial location (i,h), which very strongly implies that the value of $x_n(i,h)$ would be close to the value of $x_{n-1}(i,h)$. The usage of the motion decision parameter of the present invention is also to utilize the motion information for deinterlacing to properly mix the temporal information, which will be described later.

First, the frame difference signal $D_n$ is computed by taking the difference between the fields in one frame interval as $$D_n = |x_{n+1} - x_{n-1}|$$

which associates with the scene change that occurred between the fields $x_{n+1}$ and $x_{n-1}$. The frame difference signal is then low pass filtered to form $$d_n = LPF(D_n)$$

where LPF(•) represents a low pass filtering process over the input video signal. The M×N kernel, $W_{M \times N}$, in general, of the low pass filter LPF(•), can be expressed as $$W_{M \times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where ($w_{11}, \ldots, w_{MN}$) represents a set of predetermined coefficients. It should be mentioned that the characteristic of the LPF (•) can be all-pass filter depending on the choice of the kernel $W_{M \times N}$. That is, if the kernel is set as M=N=1, and $w_{11}$1, the LPF(•) becomes an all-pass filter and, thus, $d_n = D_n$.

Figure 6:
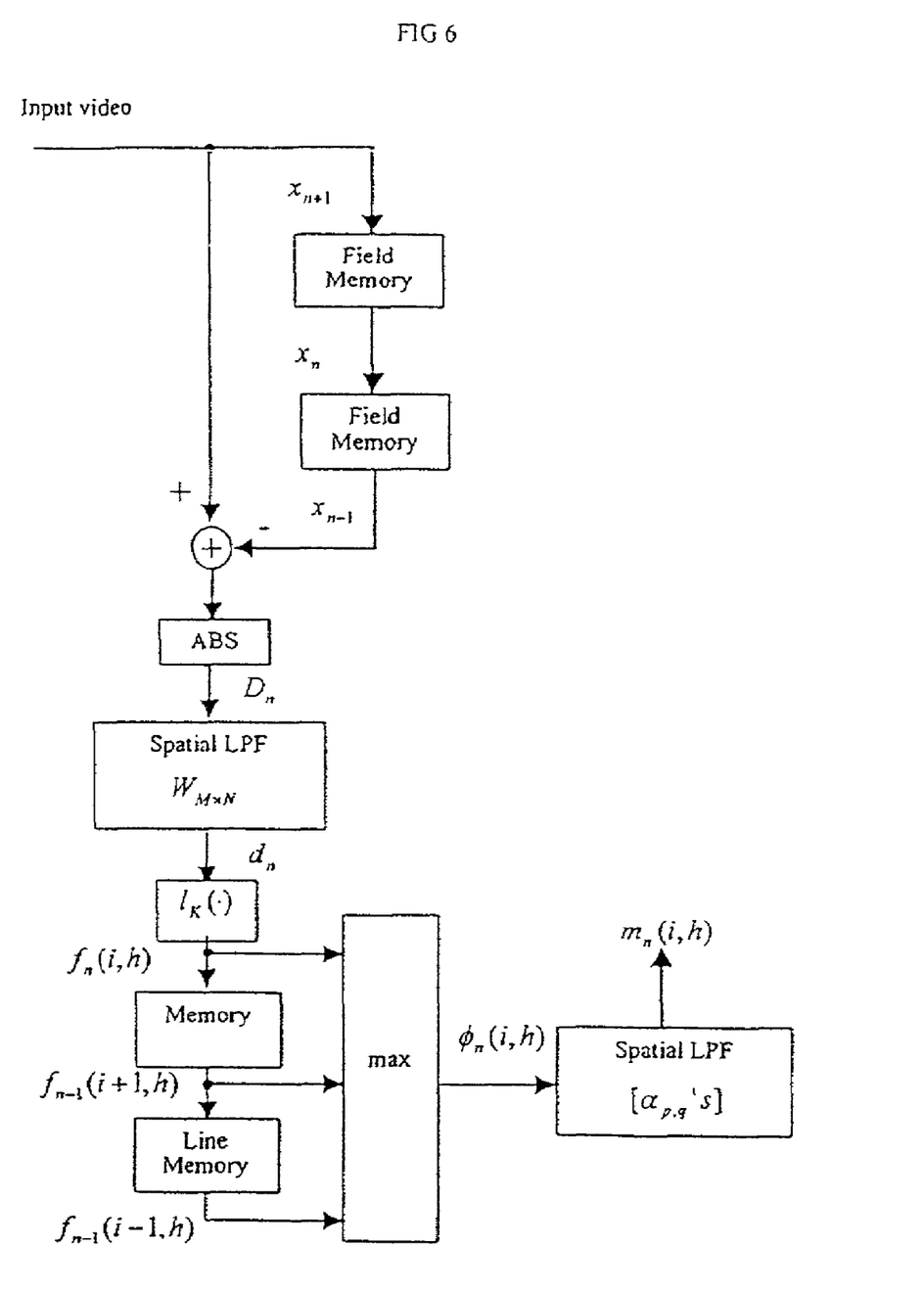

Next, a point-wise motion detection signal is computed as $$f_n(i,h) = l_K(d_n(i,h)) \qquad (1)$$

where $l^K(\bullet)$ denotes a linearly scaling function represented as $$l_K(y) = \begin{cases} 1, & \text{if } y \geq K \\ y/K, & \text{otherwise} \end{cases}$$

in which K is a positive constant value. Or, as an alternative method, we can define the scaling function $l_K(y)$ as $$l_K(y) = \begin{cases} 1, & \text{if } y \geq K \\ (y/K)^a & \text{otherwise} \end{cases}$$

where a is a real number. Or, more in general, this invention discloses to use the scaling function $l_K(y)$ as to be a monotonously increasing function represented as $l_K(0)=0$, $l_K(y)=1$ for $y \geq K$, and $$\forall 0 \leq y_1 \leq y_2 \leq K, l_K(y_1) \leq l_K(y_2)$$

which implies $l_K(y)$ is monotonously increasing as y increases. Then the region-wise motion detection signal is computed from the point-wise motion detection signal as $$\phi_n(i,h) = f_n(i,h) + \min(f_{n-1}(i-1,h), f_{n-1}(i+1,h)) \quad (2)$$

where $f_{n-1}(\bullet)$ denotes the one field delayed motion detection signal described in (1). Or, as an alternative method, we define the region-wise motion detection signal as $$\phi_n(i,h) = \text{med}(f_n(i,h), f_{n-1}(i-1,h), f_{n-1}(i+1,h)) \quad (3)$$

where med($\bullet$) denotes a median operation. Or, in order to minimize the error from a false motion detection, we define the region-wise motion detection signal as $$\phi_n(i,h) = \max(f_n(i,h), f_{n-1}(i-1,h), f_{n-1}(i+1,h)) \quad (4)$$

Finally, the region-wise motion detection signal is low pass filtered to form the motion decision parameter $m_n(i,h)$ as $$m_n(i,h) = \sum_{p=-a}^{b} \sum_{q=-c}^{d} \phi_n(i+2\cdot p, h+2\cdot q) \cdot \alpha_{p,q} \quad (5)$$

where $a,b,c,d \geq 0$, and $a_{p,q}$ represents a set of normalized (i.e., $$\sum_{p=-a}^{b} \sum_{q=-c}^{d} \alpha_{p,q} = 1$$

predetermined coefficients of a low pass filter. For instance, the kernel of the low pass filter used in (5) can be $$[\alpha'_{p,q}s] = \begin{bmatrix} 0 & 1/8 & 0 \\ 1/8 & 4/8 & 1/8 \\ 0 & 1/8 & 0 \end{bmatrix}$$

The block diagram of FIG. 4 illustrates the computation of the motion decision parameter $m_n(i,h)$ as described above with the region-wise motion detection signal defined in equation (2).

The block diagram of FIG. 5 illustrates the computation of the motion decision parameter $m_n(i,h)$ as described above with the region-wise motion detection signal defined in equation (3).

The block diagram of FIG. 6 illustrates the computation of the motion decision parameter $m_n(i,h)$ as described above with the region-wise motion detection signal defined in equation (4).

The computed motion decision parameter $m_n(i,h)$ is then used to mix a spatially interpolated signal and the a temporally interpolated signal, which is described next.

Figure 7:
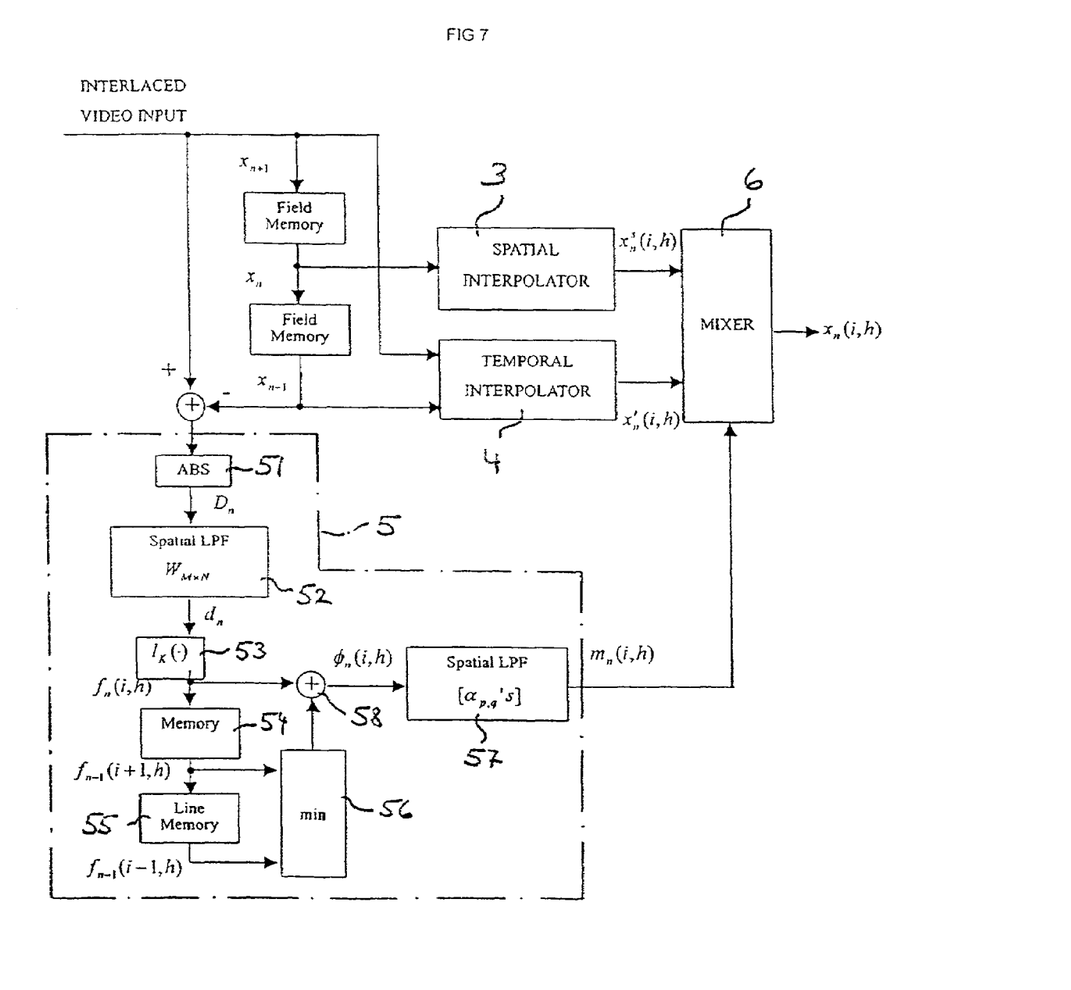
FIG. 7-9 are block diagrams illustrating the computation of the motion decision parameter, as illustrated in FIGS. 4–6, and the resultant mixing of the spatially and temporally interpolated signals in dependence on the motion decision.
Figure 8:
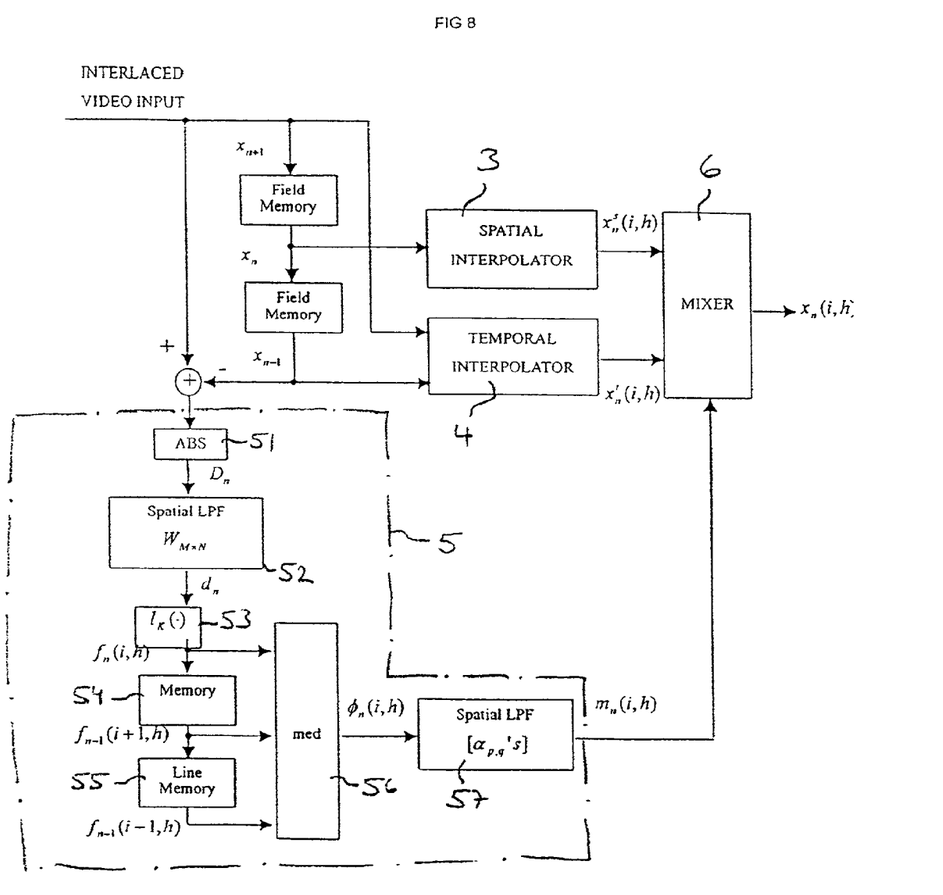
Figure 9:
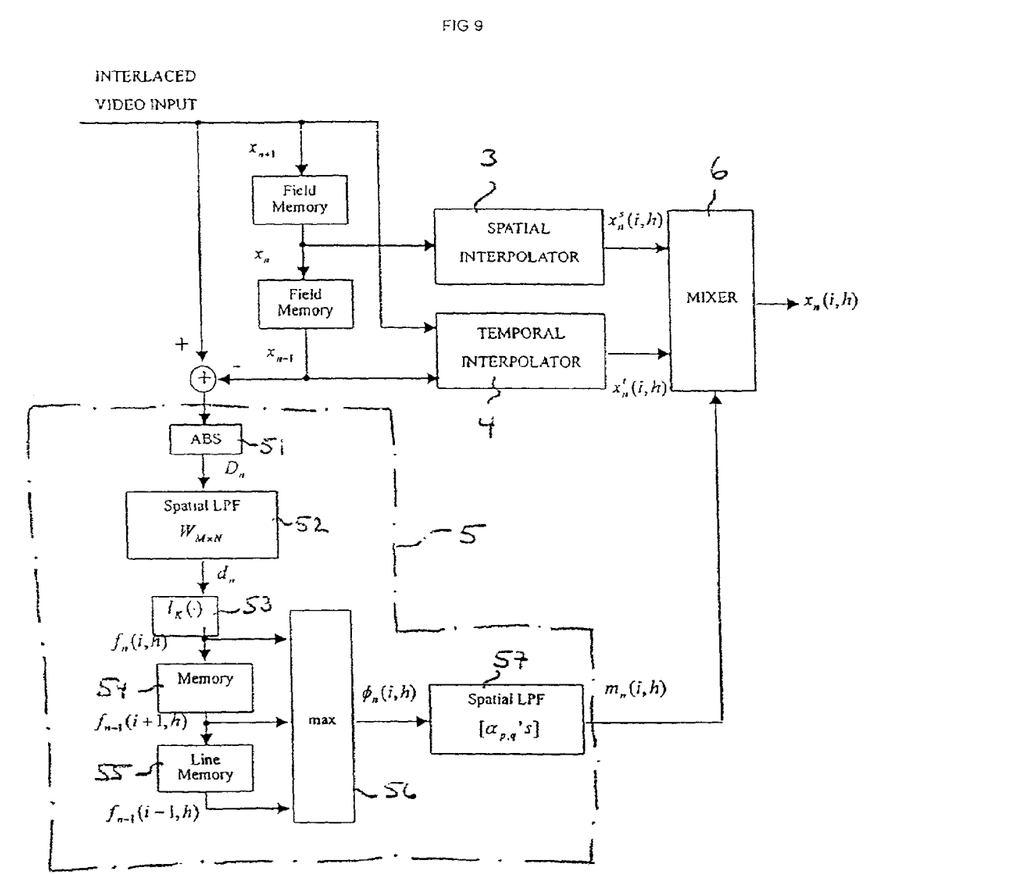

FIGS. 7, 8, and 9 are block diagrams of embodiments of the present invention for interpolating the value of $x_n(i,h)$ for an interlaced video sequence. The apparatus comprises a spatial interpolator 3, a temporal interpolator 4, a motion decision processor 5, and a mixer 6. The decision processor 5 corresponds to the diagram illustrated in FIGS. 4, 5, and 6, respectively, and includes, in a signal flow direction, an absolute value former 51 which defines the absolute difference parameter $D_n$; a first low pass filter LPF 52 in which the filtering function $W_{M \times N}$ with the M×N kernel is set; the member 53 represents the linearly scaling function as outlined above; a buffer memory 54 and a further line memory 55 are connected to a minimum former 56; the function signal $\phi_n(i,h)$ is formed in an adder 58 from the signal $f_n(i,h)$ and the signal from the member 56; finally, the motion detection signal $m_n(i,h)$ is formed by low pass filtering in a second filter, i.e., a spatial low pass filter LPF 57. The output of the low pass filter 57 is connected so that the motion detection signal $m_n(i,h)$ is supplied to a control input of the mixer 6.

The spatial interpolator 3 spatially interpolates the value of $x_n(i,h)$ by using a predetermined algorithm. The temporal interpolator 4 temporally interpolates the value of $x_n(i,h)$ by using a predetermined algorithm. The motion decision processor 5 computes the motion decision value, $m_n(i,h)$ as disclosed in the foregoing, which represents the degree of the motion at the interpolation location (i,h). Conceptually, the value of the motion decision parameter will be bounded as $0 \leq m_n(i,h) \leq 1$ where $m_n(i,h)=0$ implies "no motion" and $m_n(i,h)=1$ implies "motion". The mixer 6 mixes the output signal $x_n^s(i,h)$ of the spatial interpolator 3 and the output signal $x_n^t(i,h)$ of the temporal interpolator 4 in accordance with the motion decision value. Where $x_n^s(i,h)$ and $x_n^t(i,h)$ are the output signal of the spatial interpolator 3 and the output signal of the temporal interpolator 4, respectively, the output signal of the mixer, or, the interpolated signal is represented as $$x_n(i,h) = (1 - m_n(i,h)) \cdot x_n^t(i,h) + m_n(i,h) \cdot x_n^s(i,h) \quad (6)$$

Note that $x_n(i,h) = x_n^t(i,h)$ when $m_n(i,h)=0$ (no motion) and $x_n(i,h) = x_n^s(v,h)$ when $m_n(i,h)=1$ (motion).

In FIG. 7, FIG. 8, and FIG. 9, it does not matter what kind of a spatial interpolating algorithm and a temporal interpolating algorithm are used for the spatial interpolator 3 and the temporal interpolator 4, respectively. The present invention only relates to estimating the motion decision value $m_n(i,h)$ and to mixing a spatially interpolated signal and a temporally interpolated signal in accordance with the estimated motion decision value.

Specific information with regard to the interpolation of interlaced video signals and interlaced to progressive conversion is readily available to those of skill in the pertinent art. The above-noted disclosures, namely U.S. Pat. Nos. 5,943,099 and 5,959,681, are specifically incorporated by reference.

Some examples of the spatially interpolated signal $x_n^s(v,h)$ are $$x_n^s(i,h) = (x_n(i-1,h) + x_n(i+1,h))/2$$

which corresponds to a line average and $$x_n^s(i,h) = x_n(i-1,h)$$

which corresponds to a method known as line doubling.

Some examples of temporally interpolated signal $x_n^s(v,h)$ are $$x_n^t(i,h) = (x_{n+1}(i,h) + x_{n-1}(i,h))/2$$

and $$x_n^t(i,h) = x_{n-1}(i,h)$$

What is claimed is:

1. In a video signal processing system, a method of computing a motion decision value, which comprises the following steps:

inputting a video signal with an interlaced video sequence of fields;

computing a frame difference signal from a difference between a previous field and a next field in the video sequence;

forming a point-wise motion detection signal from the frame difference signal;

computing a region-wise motion detection signal from the point-wise motion detection signal and an adjacent point-wise motion detection signal delayed by one field; and forming from the region-wise motion detection signal a motion decision value and outputting the motion decision value.

2. The method according to claim 1, which further comprises low-pass filtering the difference signal prior to the step of forming the point-wise motion detection signal.

3. The method according to claim 2, wherein the step of low-pass filtering is defined by a low pass filter matrix $$W_{M \times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where $w_{11}, \ldots w_{MN}$ represent a set of predetermined coefficients.

4. The method according to claim 1, wherein the step of forming the point-wise motion detection signal comprises computing $$f_n(i,h) = l_K(d_n(i,h))$$

where $f_n$ is the point-wise motion detection signal, i and h define a spatial location of the respective video signal value in a cartesian matrix, $l_K(\bullet)$ denotes a linearly scaling function represented as $$l_K(y) = \begin{cases} 1, & \text{if } y \geq K \\ y/K, & \text{otherwise} \end{cases}$$

in which K is a positive constant value.

5. The method according to claim 1, wherein the step of forming the point-wise motion detection signal comprises computing $$f_n(i,h) = l_K(d_n(i,h))$$

where $f_n$ is the point-wise motion detection signal, i and h define a spatial location of the respective video signal value in a cartesian matrix, $l_K(\bullet)$ denotes a linearly scaling function represented as $$l_K(y) = \begin{cases} 1, & \text{if } y \geq K \\ (y/K)^a, & \text{otherwise} \end{cases}$$

where K is a positive constant value and a is a real number.

6. The method according to claim 1, wherein the region-wise motion detection signal is computed from the point-wise motion detection signal by an equation selected from the group consisting of $$\phi_n(i,h) = f_n(i,h) + \min(f_{n-1}(i-1,h), f_{n-1}(i+1,h))$$

$$\phi_n(i,h) = \text{med}(f_n(i,h), f_{n-1}(i-1,h), f_{n-1}(i+1,h))$$

$$\phi_n(i,h) = \max(f_n(i,h), f_{n-1}(i-1,h), f_{n-1}(i+1,h))$$

where $f_{n-1}(\bullet)$ denotes a motion detection signal delayed by one field, med($\bullet$) denotes a median operation, max($\bullet$) denotes an operation to minimize an error from a false motion detection, and the indices i and h define a spatial location of the respective video signal value in a cartesian matrix.

7. The method according to claim 1, which further comprises low-pass filtering the region-wise motion detection signal prior to the outputting step.

8. The method according to claim 7, wherein the region-wise motion detection signal is low-pass filtered to form the motion decision value $m_n(i,h)$ by:

$$m_n(i,h) = \sum_{p=-a}^{b} \sum_{q=-c}^{d} \phi_n(i + 2 \times p, h + 2 \times q) \cdot \alpha_{p,q}$$

where $a,b,c,d \geq 0$, and $\alpha_{p,q}$ represents a set of normalized predetermined coefficients of a low pass filter.

9. The method according to claim 7, which comprises defining a kernel of the low pass filter as $$[\alpha'_{p,q}s] = \begin{bmatrix} 0 & 1/8 & 0 \\ 1/8 & 4/8 & 1/8 \\ 0 & 1/8 & 0 \end{bmatrix}.$$

10. The method according to claim 1, wherein the step of forming the point-wise motion detection signal comprises the steps of scaling the frame difference signal to form the point-wise motion detection signal.

11. The method according to claim 1, wherein the step of forming the point-wise motion detection signal comprises the steps of linearly scaling the frame difference signal to form the point-wise motion detection signal.

12. The method according to claim 1, wherein the step of forming the point-wise motion detection signal comprises the steps of scaling the frame difference signal with a monotonously increasing function, to form the point-wise motion detection signal.

13. In a method of processing interlaced video signals, which comprises:

spatially interpolating a value of the video signal at a given location from a video signal of at least one adjacent location in a given video field;

temporally interpolating the value of the video signal at the given location from a video signal at the same location in temporally adjacent video fields; and forming a motion decision value for the same location in accordance with claim 1; and mixing an output signal for the video signal at the given location from the spatially interpolated signal and the temporally interpolated signal and weighting the output signal in accordance with the motion decision value.

14. The method according to claim 13, which comprises varying the motion decision value between 0 and 1 as a function of an estimate of the degree of motion at the given location and, upon estimating a high degree of motion, heavily weighting the output signal towards the spatially interpolated signal and, upon estimating a low degree of motion, heavily weighting the output signal towards the temporally interpolated signal.

15. The method according to claim 14, which comprises outputting the spatially interpolated signal as the output signal upon estimating a high degree of motion, and outputting the temporally interpolated signal as the output signal upon estimating a low degree of motion.

16. In a video signal processing system, an apparatus for computing a motion decision value, comprising:
- an input for receiving a video signal with an interlaced video sequence;
- difference forming means connected to said input for computing a frame difference signal from a difference between a previous field and a next field of a current field to be deinterlaced;
- means for forming a point-wise motion detection signal from the frame difference signal, and for computing a region-wise motion detection signal from the point-wise motion detection signal and an adjacent point-wise motion detection signal delayed by one field; and
- means for forming from the region-wise motion detection signal a motion decision value and for outputting the motion decision value.

17. The apparatus according to claim 16, which further comprises a low-pass filter connected to said difference forming means.

18. The apparatus according to claim 17, wherein said low-pass filter is programmed with a low pass filter matrix $$W_{M \times N} = \begin{bmatrix} w_{11} & w_{12} & \cdots & w_{1N} \\ w_{21} & w_{22} & \cdots & w_{2N} \\ \vdots & \vdots & \ddots & \vdots \\ w_{M1} & w_{M2} & \cdots & w_{MN} \end{bmatrix}$$

where $w_{11}, \ldots w_{MN}$ represent a set of predetermined coefficients.

19. The apparatus according to claim 16, wherein said means for forming the point wise motion detection signal are programmed to compute $$f_n(i,h) = l_K(d_n(i,h))$$

where $l_n$ is the point-wise motion detection signal, i and h define a spatial location if the respective video signal value in a cartesian matrix, $l_K(\bullet)$ denotes a linearly scaling function represented as $$l_K(y) = \begin{cases} 1, & \text{if } y \geq K \\ y/K, & \text{otherwise} \end{cases}, \text{ and}$$

K is a positive constant value.

20. The apparatus according to claim 16, wherein said means for forming the point wise motion detection signal are programmed to compute $$f_n(i,h) = l_K(d_n(i,h))$$

where $f_n$ is the point-wise motion detection signal, i and h define a spatial location of the respective video signal value in a cartesian matrix, $l_K(\bullet)$ denotes a linearly scaling function represented as $$l_K(y) = \begin{cases} 1, & \text{if } y \geq K \\ (y/K)^a & \text{otherwise} \end{cases}, \text{ and}$$

wherein K is a positive constant value and a is a real number.

21. The apparatus according to claim 16, wherein the means for computing the region-wise motion detection signal are programmed to compute the region-wise motion detection signal from the point-wise motion detection signal by an equation selected from the group consisting of $$\phi_n(i,h) = f_n(i,h) + \min(f_{n-1}(i-1,h), f_{n-1}(i+1,h))$$

$$\phi_n(i,h) = \text{med}(f_n(i,h), f_{n-1}(i-1,h), f_{n-1}(i+1,h))$$

$$\phi_n(i,h) = \max(f_n(i,h), f_{n-1}(i-1,h), f_{n-1}(i+1,h))$$

where $f_{n-1}(\bullet)$ denotes a motion detection signal delayed by one field, med($\bullet$) denotes a median operation, max($\bullet$) denotes an operation to minimize an error from a false motion detection, and the indices i and h define a spatial location of the respective video signal value in a cartesian matrix.

22. The apparatus according to claim 16, which further comprises a low-pass filter connected to an output of said outputting means.

23. The apparatus according to claim 22, wherein said low-pass filter is programmed to filter the region-wise motion detection signal to form the motion decision value $m_n(i,h)$ by:

$$m_n(i,h) = \sum_{p=-a}^{b} \sum_{q=-c}^{d} \phi_n(i + 2 \times p, h + 2 \times q) \cdot \alpha_{p,q}$$

where $a,b,c,d \geq 0$, and $\alpha_{p,q}$ represents a set of normalized predetermined coefficients of said low pass filter.

24. The apparatus according to claim 23, wherein said low-pass filter is defined with a kernel $$[\alpha'_{p,q}s] = \begin{bmatrix} 0 & 1/8 & 0 \\ 1/8 & 4/8 & 1/8 \\ 0 & 1/8 & 0 \end{bmatrix}.$$

25. An apparatus of processing interlaced video signals, which comprises:
- an input for receiving a video signal with an interlaced video sequence of fields;
- a spatial interpolator connected to said input and configured to spatially interpolate a value of the video signal at a given location from a video signal of at least one adjacent location in a given video field;
- a temporal interpolator connected to said input in parallel with said spatial interpolator for temporally interpolating the value of the video signal at the given location from a video signal at the same location in temporally adjacent video fields; and
- a computing apparatus according to claim 16 connected to said input and in parallel with said spatial interpolator and said temporal interpolator for forming a motion decision value for the same location; and a mixer connected to receive an output signal from each of said spatial interpolator, said temporal interpolator, and said computing apparatus, said mixer being configured to mix an output signal for the video signal at the given location from the spatially interpolated signal and the temporally interpolated signal in dependence on the motion decision value output by said computing apparatus.

* * * * *